United States Patent [19]
Lyon

[11] 3,990,488
[45] Nov. 9, 1976

[54] REVITALIZING SHOCK ABSORBERS AND KIT THEREFOR

[76] Inventor: Thomas R. Lyon, 521 Terrado Drive, Monrovia, Calif. 91016

[22] Filed: Feb. 12, 1973

[21] Appl. No.: 331,502

Related U.S. Application Data

[62] Division of Ser. No. 854,868, Sept. 3, 1969, Pat. No. 3,751,786.

[52] U.S. Cl. .............................. 141/98; 29/401 F; 188/322; 188/352
[51] Int. Cl.² ........................................ B65B 3/04
[58] Field of Search ........... 188/322, 352; 29/401.7; 206/47 R; 141/329, 98

[56] References Cited
UNITED STATES PATENTS

| | | | |
|---|---|---|---|
| 610,594 | 9/1898 | Whitbeck | 29/401 |
| 2,424,807 | 7/1947 | Eckman | 141/329 |
| 3,376,957 | 4/1968 | Baumgartner | 188/322 X |

FOREIGN PATENTS OR APPLICATIONS 1,057,604  10/1953  France .............................. 188/322

*Primary Examiner*—George E. A. Halvosa
*Attorney, Agent, or Firm*—Sellers and Brace

[57] ABSTRACT

A kit of accessories useful in extending the service life of a permanently assembled shock absorber and the resulting product provided thereby. The kit includes a boring tool, one or more self-tapping plugs and a container of sufficient fluid to replace the original fluid charge and having a viscosity effective to substantially restore the original operating characteristics of the shock absorber.

6 Claims, 4 Drawing Figures

U.S. Patent   Nov. 9, 1976   3,990,488
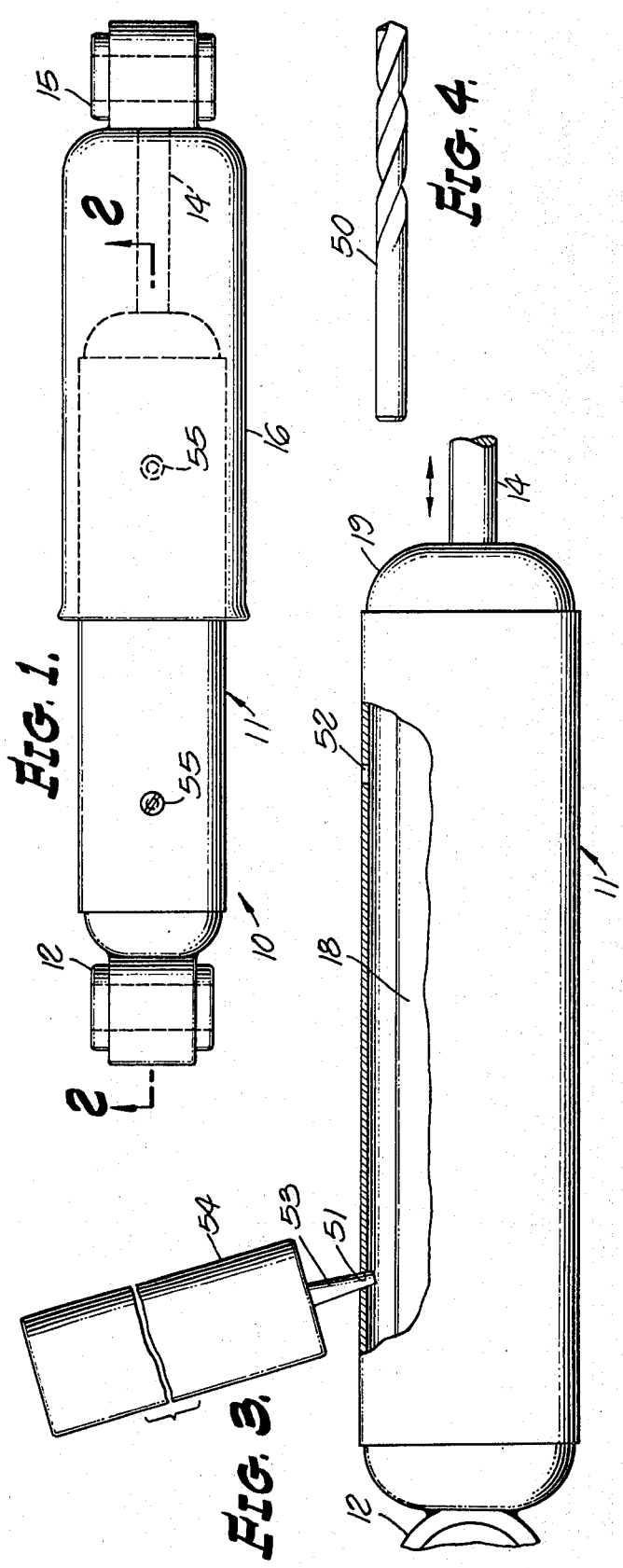
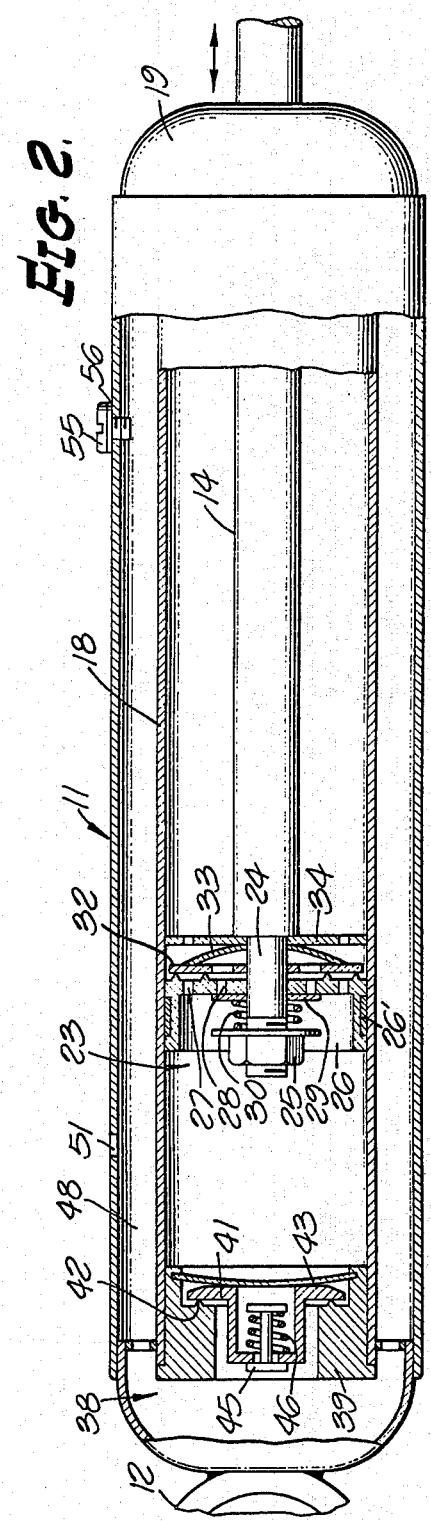

REVITALIZING SHOCK ABSORBERS AND KIT THEREFOR

This is a division of my application for U.S. Letters Pat. Ser. No. 854,868, filed Sept. 3, 1969, now U.S. Pat. No. 3,751,786, entitled Method and Service Kit for Revitalizing Shock Absorbers.

This invention relates to shock absorbers, and more particularly to means for and a method of processing used well-worn permanently assembled shock absorbers in a simple, inexpensive manner to restore their operating effectiveness.

Many shock absorbers, particularly those in common use on motor vehicles, are permanently assembled at the time of manufacture. For this reason, it is not feasible to replace worn and unserviceable parts making it necessary to replace an unserviceable shock absorber with a new one.

By this invention there is provided a simple, inexpensive highly effective technique for extending the service life of worn shock absorbers suitable for practice by mechanics, service stations and vehicle owners following simple instructions and using readily available simple tools. The service kit proper includes a boring tool, a new charge of fluid adequate for recharging the shock absorber and suitable means for replugging holes made by a piercing tool furnished with the kit to drain the original fluid from the assemblies. A sealed container of fresh fluid is preferably provided with a spout to facilitate transfer of the fluid into the shock absorber.

Accordingly, it is a primary object of the present invention to provide a simple, highly effective kit for reconditioning permanently assembled shock absorbers to extend the service life thereof.

Another object of the invention is the provision of a reconditioned shock absorber of the permanently assembled type recharged with fluid of higher viscosity than its original charge and effective to compensate for wear and rejuvenate a languid and enfeebled shock absorber.

Another object of the invention is the provision of a single use service kit for use in revitalizing a worn shock absorber.

Another object of the invention is the provision of a kit for revitalizing permanently assembled shock absorbers.

These and other more specific objects will appear upon reading the following specification and claims and upon considering in connection therewith the attached drawing to which they relate.

Referring now to the drawing in which a preferred embodiment of the invention is illustrated:

FIG. 1 is a side view of a typical permanently assembled shock absorber after being reconditioned in accordance with the principles of this invention;

FIG. 2 is an enlarged fragmentary view partly in section of the shock absorber and showing one of the service kit plugs removed;

FIG. 3 is a fragmentary view with a portion of the outer housing broken away and showing the assembly being recharged with fluid; and FIG. 4 is a view of the tool used to form the drain holes.

Referring more particularly to FIG. 1, there is shown a conventional permanently assembled shock absorber, designated generally 10, having a tubular main body 11. Secured to one end of this body is a coupling member 12 for use in pivotally connecting the shock absorber to a chassis axle assembly. Reciprocally supported in the upper end of main housing 11 is a piston rod 14 also provided at its outer end with a mounting coupling 15 connectable to the main frame of the chassis in known manner. A tubular dust guard 16 has its closed end fixed to coupling 15 and rod 14 and reciprocates with the latter loosely about the upper end of main housing 11.

The internal structure details of the shock absorber are not material to this invention and may be of any well known type. Those shown in FIG. 2 are typical, the main body tube 11 serving as a fluid reservoir enclosing the main cylinder 18 of the shock absorber and suitably supported concentrically of housing 11. The right hand end of cylinder 18 will be understood as having a suitable fluid seal means as is true respecting end cover 19 of reservoir 11.

Secured to the inner end of piston rod 14 is any suitable piston and valve assembly, designated generally 23. This piston is held slidably supported on the shouldered stem 24 of the piston rod by a nut 25. Piston 26 is encircled by a suitable sealing ring 26' and its bottom is provided with two rings of small ports 27,28, the smaller ring 28 being normally closed by a disc valve 29 and a compression spring 30 encircling the piston rod. The larger diameter ring of ports 27 is normally held closed by a spider valve 32 and a bowed disc spring 33 also effective to hold the perforated disc 34 seated against the shouldered end of stem 24.

Suitably supported in the lower end of cylinder 18 is a second valve assembly 38. This assembly includes a mounting ring 39 sealed across the end of cylinder 18 and supporting a cup-shaped valve member 41 normally held against seat ring 42 by a spider type disc spring 43. A poppet valve 45 is normally held seated across the port in the bottom of valve 41 by spring 46. Valve 38 serves to control the flow of fluid between the shock absorber reservoir 48 and the interior of the main cylinder 18. The operation of the two valve assemblies 23 and 38 need not be described since they are well known to persons skilled in this art.

To revitalize a worn shock absorber, the user detaches assembly 10 from the vehicle and utilizes the tool 50 to drill or pierce a pair of holes 51,52 along one side near the opposite ends of reservoir casing 11. The original fluid charge of the absorber is then drained from openings 51,52 while reciprocating piston rod 14 as draining proceeds to facilitate drainage of the fluid present in the cylinder 18 to either side of piston 23. Once the operator is assured substantially all of the old fluid has been drained, the tip of spout 53 of a plastic container 54 is cut off. This container carries sufficient fluid to recharge at least one and preferably all four shock absorbers of a single vehicle. It is important that the viscosity of the new fluid charge be substantially greater than the viscosity of the original fluid charge. The particular viscosity rating will be understood as varying slightly for different shock absorber constructions and should be selected to compensate for normal wear experienced by a particular absorber construction after a designated usage, as 10,000 miles. Nozzle 53 of container 54 is sized to fit readily into one of the openings 51 and 52, the displaced air present being vented to the atmosphere through the other opening. During the charging operation, piston rod 14 is operated to and fro to aid in distributing the charge interiorly of cylinder 18. Either of the ports 51,52 may be used as the charging port and the other as a vent.

It will be understood that fluid container 54 is preferably transparent or semi-transparent and provided with level marks distributed along its side to indicate when the proper proportion of its contents has been charged into each of the shock assemblies of a vehicle. Alternatively, separate containers of fluid adequate for each of the four shock absorbers may be provided so that the user merely dispenses the entire contents of one container in to each of the shock assemblies.

After the new fluid charge has been introduced, openings 51,52 are closed by self-tapping screws each provided with a sealing gasket 56. The assemblies are now ready for reassembly to the vehicle and will function substantially with the same effectiveness and efficiency as when new owing to the new timing characteristics imparted to the absorber by its higher viscosity fluid charge.

While the particular revitalizing shock absorbers and kit therefor herein shown and disclosed in detail is fully capable of attaining the objects and providing the advantages hereinbefore stated, it is to be understood that it is merely illustrative of the presently preferred embodiments of the invention and that no limitations are intended to the detail of construction or design herein shown other than as defined in the appended claims.

I claim:

1. A shock absorber service kit for use to recondition a well-worn permanently assembled non-rechargeable type shock absorber to extend the effective service life thereof, said kit including a tool for use in forming a hole through the wall of said permanently assembled shock absorber through which fluid can be withdrawn, a container of shock absorber fluid of higher viscosity than the original fluid charge and effective when dispensed into said shock absorber through said hole to compensate for wear and revitalize said shock absorber, and plug means sized to form a fluid tight closure for said hole and adapted to be mounted therein after said shock absorber has been revitalized with said higher viscosity fluid.

2. A service kit as defined in claim 1 characterized in that said container has a fluid dispensing spout having a tip end sized to expedite dispensing higher viscosity fluid into a shock absorber.

3. A service kit as defined in claim 1 characterized in that the components thereof are adapted for one time use in servicing a single shock absorber and wherein the fluid container and said tool are discardable after use in servicing a worn shock absorber.

4. A service kit as defined in claim 1 characterized in the provision of a plurality of said closure plug means usable in closing a respective hole formed in the wall of said permanently assembled shock absorber and each useful in plugging a respective hole formed to facilitate draining and recharging said shock absorber and wherein one hole permits air flow while another hold is being used for fluid flow.

5. A well-worn permanently assembled non-rechargeable type shock absorber which has been processed to recondition and extend the effective service life thereof without disassembly of its principal components, said reprocessed shock absorber having at least one plugged hole through a wall thereof which hole has been used in draining fluid of a prior charge from the shock absorber and in charging the shock absorber with fluid having substantially greater viscosity than the former fluid charge and being effective to revitalize the reprocessed shock absorber and substantially restore its former operating characteristics.

6. A kit for use in revitalizing a well-worn shock absorber of the permanently assembled non-rechargeable type to virtually restore its operating characteristics, said kit comprising a tool for forming a hole through the wall of a well-worn permanently assembled shock absorber to permit withdrawal of fluid therefrom, a dispensing container of new fluid having a viscosity effective to compensate for wear of the shock absorber and to restore the operating characteristics thereof, and means for closing the opening formed to recharge the shock absorber after a requisite quantity of said higher viscosity fluid has been dispensed thereinto from said dispensing container.

* * * * *